(12) United States Patent
Meyer et al.

(10) Patent No.: US 6,262,944 B1
(45) Date of Patent: Jul. 17, 2001

(54) SOLID FILL ACOUSTIC ARRAY

(75) Inventors: A. Douglas Meyer, Woodland Hills; Patrick J. Welton, Thousand Oaks; James K. Andersen, Westlake Village, all of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/255,278

(22) Filed: Feb. 22, 1999

(51) Int. Cl.[7] ....................................................... G01V 1/38
(52) U.S. Cl. ............................ 367/154; 367/20; 174/101.5
(58) Field of Search .................... 367/20, 154; 174/101.5

(56) References Cited

U.S. PATENT DOCUMENTS

| | | | |
|---|---|---|---|
| 4,115,753 | * | 9/1978 | Shajenko ............................ 340/854.7 |
| 4,955,012 | * | 9/1990 | Bledsoe et al. ........................ 367/154 |
| 5,046,055 | * | 9/1991 | Ruffa ...................................... 367/154 |
| 5,709,497 | * | 1/1998 | Zoch et al. ............................ 114/245 |
| 5,745,436 | * | 4/1998 | Bittleston .............................. 367/20 |
| 5,777,954 | * | 7/1998 | Hepp ...................................... 367/20 |
| 5,781,510 | * | 7/1998 | Chang et al. .......................... 367/154 |
| 5,867,451 | * | 2/1999 | Chang et al. .......................... 367/20 |
| 5,943,293 | * | 8/1999 | Luscombe et al. .................... 367/20 |

* cited by examiner

Primary Examiner—Ian J. Lobo
(74) Attorney, Agent, or Firm—Price and Gess

(57) ABSTRACT

An acoustic array including a plurality of acoustic sensors positioned at predetermined telemetry points for measuring the acoustic energy from the surrounding environment. The acoustic sensors are each positioned within a fluid-filled pocket in the acoustic array, wherein each the various fluid-filled pockets are separated from each other by a section of solid fill buoyant material. The sections of solid fill material control the buoyancy of the acoustic array. The acoustic array is surrounded by a longitudinally extending outer hosewall which encloses the acoustic array and forms the fluid-filled pockets between the sections of solid fill material. A strength member is extended longitudinally throughout the length of the acoustic array to provide a load bearing mechanism for distributing longitudinal tensile loads applied to the acoustic array, while support spacers are situated within the acoustic array to provide radial support for the acoustic array. The acoustic array is formed of a lightweight and electrically passive structure which allows water to be used as the fill fluid for the pockets. Using water as the fill fluid provides an environmentally-safe fill fluid having buoyancy characteristics which are not significantly altered by its mixture with water from the surrounding environment should a rupture in the hosewall occur.

44 Claims, 3 Drawing Sheets

SOLID FILL ACOUSTIC ARRAY

BACKGROUND OF THE INVENTION

Field of the Invention

The present invention relates generally to an array of acoustic sensors, and specifically to an improved acoustic array utilizing a solid fill material for controlling the buoyancy properties of the acoustic array.

DESCRIPTION OF RELATED ART

In order to measure a variety of different events or conditions in underwater environments, it is common to position an array of interconnected sensors in the underwater environment. For instance, acoustic arrays of hydrophonic sensors are used to sense sounds traveling through the underwater environment. These acoustic arrays are typically formed by arranging the hydrophonic sensors within a sealed flexible tube-like casing which seals the sensors from the external environmental elements. In order to provide the acoustic array with controlled buoyancy, the sealed casing is filled with a low density fill fluid. Many of these fill fluids are hydrocarbon-based fluids, which have the drawback of requiring strict handling requirements due to the environmental regulations associated with most underwater environments. Conventional acoustic arrays are formed of electrically active components, as they typically consist of piezo-ceramic (PZT) elements used for acoustic detection with copper wire used for the transmission of information to and from the array of PZT elements. These conventional components are inherently dense, thus requiring a fill fluid having a low specific gravity to generate a neutral buoyancy for the acoustic array in water. Additionally, the fill fluids that are chosen must also be good electrical insulators so as not to short the electrical pathways in the acoustic array. If a break in the sealed casing should occur, the fill fluid could leak from the acoustic array into the underwater environment. This loss of fill fluid can cause the acoustic array to lose buoyancy and sink. Further, water from the surrounding underwater environment would pass through the break: in the sealed casing into the acoustic array and potentially damage the electrical continuity of the array, since electricity can be conducted through the water now surrounding the internal elements of the array.

Clearly, there is a need for an acoustic array which is comprised of lightweight components in order to reduce the buoyancy and composition requirements of the fill fluids within an acoustic array. Moreover, there is a need for an acoustic array formed of electrically passive components in order to prevent electrical conductivity problems from arising from potential breaks in the sealed casing of the acoustic array.

SUMMARY OF THE INVENTION

It is a primary object of the present invention to overcome the aforementioned shortcomings associated with the prior art.

The present invention provides an acoustic array comprised of electrically passive components which allow the acoustic array to be formed from lightweight components. The lightweight components forming the acoustic array of the present invention reduce the buoyancy requirements of the acoustical array. The electrically passive components used to form the acoustic array of the present invention are also inert, which reduces the effects which the surrounding environment can have on the buoyancy and performance of the acoustic array from any leaks which may develop in an outer casing which seal the acoustic array from the surrounding environment.

The present invention still further provides an acoustical array which utilizes a solid fill material to provide controlled buoyancy properties for the acoustic array.

Moreover, the acoustic array of the present invention allows a water-based fluid to be used as a fill fluid for the transduction of acoustic energy into an acoustic sensor in the acoustic array, which eliminates the environmental concerns associated with fill fluids and reduces the effects which water from the surrounding environment can have on the buoyancy of the acoustic array when incidentally mixing with the fill fluid.

These as well as additional advantages of the present invention are achieved by providing an acoustic array including a plurality of acoustic sensors positioned along predetermined telemetry points for measuring acoustic energy from a surrounding underwater environment. The acoustic array is surrounded by a longitudinally extending outer tube-like hosewall. The acoustic sensors are each positioned within a fluid-filled pocket formed in the acoustic array, wherein each of the various fluid-filled pockets are separated from each other by a section of buoyant solid fill material. The solid fill material provides the buoyancy for the acoustic array, where the acoustic sensors are positioned in the gaps between the sections of solid fill material. The outer hosewall which encloses the acoustic array forms the fluid-filled pockets in the gaps between the sections of solid fill material. At least one strength member is extended longitudinally throughout the length of the acoustic array to provide a load bearing mechanism for distributing longitudinal tensile loads applied to the acoustic array. The acoustic array also includes support spacers situated within the acoustic array to provide radial support for the acoustic array and prevent the outer hosewall or strength member from collapsing inward.

The acoustic array is formed of a lightweight and electrically passive structure which allows a water-based fluid to be used as the fill fluid in the fluid-filled pockets to propagate the acoustic energy from the underwater environment to the acoustic sensors in the fluid-filled pockets. Using a water-based fill fluid provide an environmentally-safe fill fluid having buoyancy characteristics which are not significantly altered by its mixture with water from the surrounding underwater environment should a leak in the hosewall occur. Further, should the hosewall develop a rupture, the intrusion of water from the surrounding underwater environment into the water-filled pockets will not significantly alter the buoyancy of the array.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an acoustic array utilizing a solid fill material to control the buoyancy properties of the acoustic array.

Figure 1:
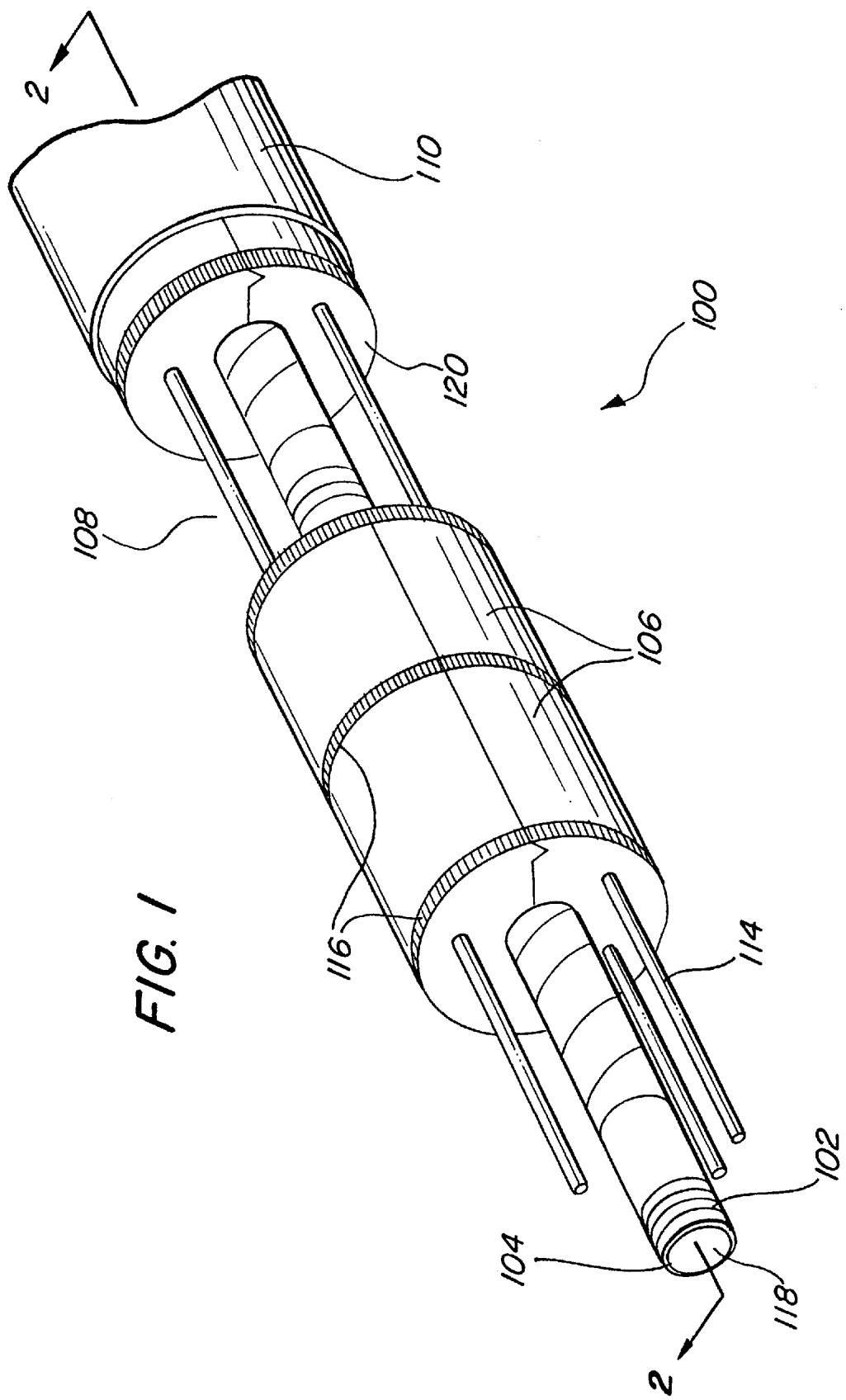
FIG. 1 is a partial cut-away perspective view of the acoustic array formed in accordance with a preferred embodiment of the present invention.

Referring now to FIG. 1, a partial cut-away perspective view of a preferred embodiment of the acoustic array 100 of the present invention is illustrated. The array includes a plurality of acoustic sensors 102 positioned at predetermined telemetry points along a longitudinal direction of array 100. The acoustic sensors 102 serve as hydrophones for measuring the acoustic energy from the underwater environment surrounding the acoustic sensors 102. The acoustic sensors 102 are preferably formed by wrapping an optical fiber around a longitudinally extending core 104, where the acoustic energy acting on the optical fiber will place a strain on the optical fiber which, in turn, will affect the wavelength propagation characteristics of the optical fiber. The acoustic energy acting on the acoustic sensors 102 may then be determined by measuring the wavelength propagation characteristics of the optical fiber. It is understood that the acoustic sensors 102 may comprise any type of optical based acoustic sensor.

A plurality of sections of solid fill material 106 are positioned within the acoustic array 100 for controlling the buoyancy characteristics of the acoustic array 100, where the sections of solid fill material 106 may provide positive, neutral, or negative buoyancy depending upon the desired buoyancy characteristics of the acoustic array 100. Each section of solid fill material 106 is separated from an adjacent section of solid fill material 106 by a gap 108. The acoustic sensors 102 are positioned in the gaps 108 existing between the sections of solid fill material 106. Each gap 108 may contain either a single respective acoustic sensor 102 or multiple sensors. The sections of solid fill material 1106 provide the buoyancy for the acoustic array 100, where the solid fill material 106 comprises a semi-rigid material. Acoustic arrays 100 are often towed behind vessels in an ocean environment, where the sections of solid fill material 106 can be designed to provide the acoustic array 100 with a neutral buoyancy while being towed.

In a preferred embodiment of the present invention, the solid fill material 106 is formed from a polyurethane material filled with a certain weight percentage of incompressible voids to form a solid fill material 106 having a density which provides the desired buoyancy characteristics for the acoustic array 100. The weight percentage of the incompressible voids may be variably selected for the particular buoyancy requirements of the acoustic array 100. The incompressible voids maintain the same buoyancy factor at all depths. The incompressible voids may be formed from glass micro-balloons, metal micro-balloons, high strength macro-balloons, or other incompressible structures. It is understood to those skilled in the art that other semi-rigid materials could be used for solid fill material 106 other than polyurethane, including rubbers or epoxies filled with incompressible voids. The solid fill material 106 can be positioned within the acoustic array 100 in any number of ways, including being molded into the acoustic array 100 or being manufactured in bulk lengths and then cut into sections and positioned within the acoustic array 100.

Figure 2:
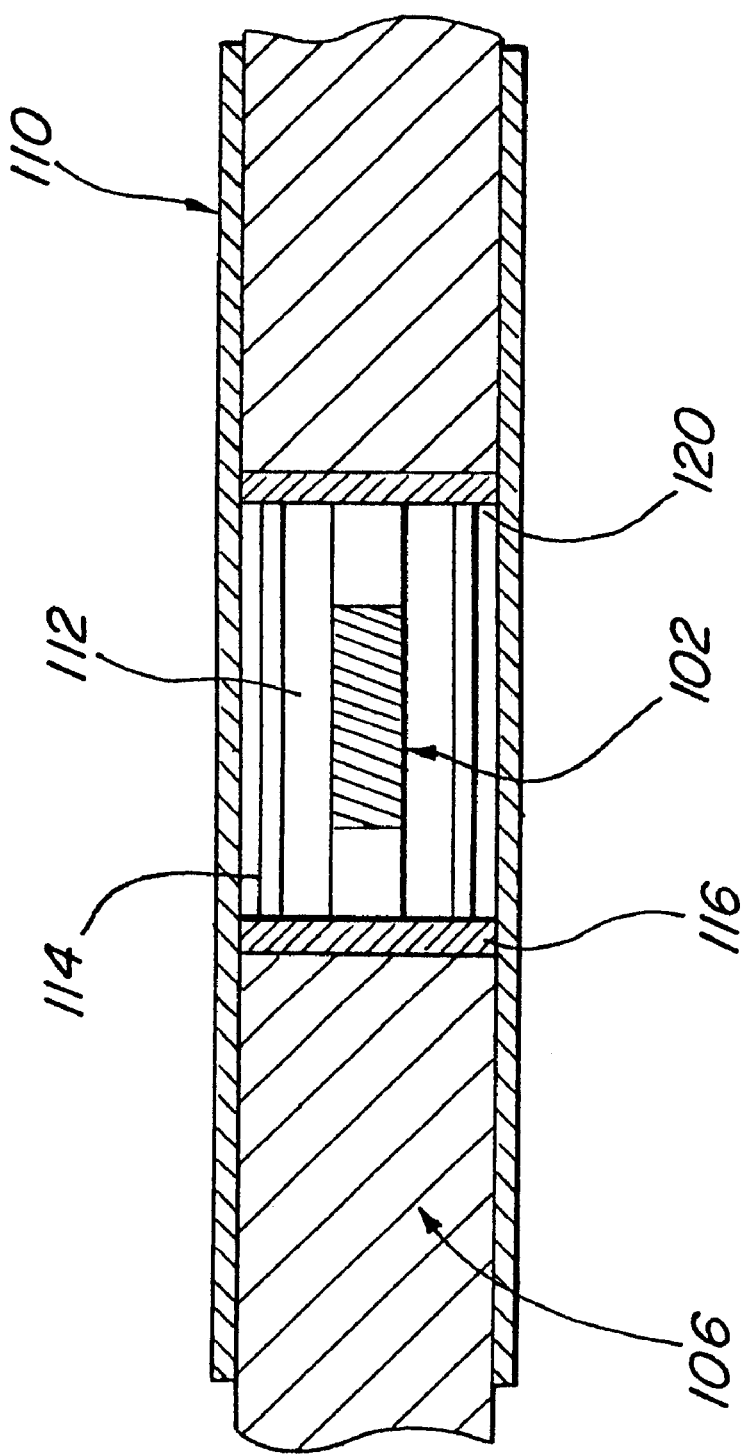
FIG. 2 is a sectional side view of the acoustic array taken generally along line II—II of FIG. 1.

A longitudinally extending outer tube-like casing or hosewall 110 is arranged to enclose the components of the acoustic array 100 and seal the components of the acoustic array 100 from the underwater environment surrounding the hosewall 100. When the internal structure of the acoustic array 100 is covered by the outer hosewall 110, pockets 112 are formed in the gaps 108 between the sections of solid fill material 106, as illustrated in FIG. 2. The pockets 112 are filled with a fluid which allows the acoustic energy to propagate from the underwater environment to the acoustic sensors 102 in the acoustic array 100, wherein the hosewall 110 is formed from a sufficiently thin material so as not to significantly hinder the propagation of acoustic energy from the underwater environment into the pockets 112. The pockets 112 are fluidically separated from one another, which prevents longitudinally-traveling waves, bulge waves, from propagating through the acoustic array 100 that can generate noise in the acoustic sensors 102. The components forming the acoustic array 100 are chosen to be lightweight and electrically passive, which allows the solid fill material 106 to provide the necessary buoyancy for the acoustic array 100. Thus, the fill fluid for the pockets 112 does not need to provide additional buoyancy for the acoustic array 100.

The construction of the acoustic array 100 of the present invention allows a water-based fluid to be used as the fill fluid for the pockets 112. The fill fluid may either be comprised entirely of water or may be water-based with other additives. These additives may be used to ensure reliable performance by the acoustic array 100. For instance, the water-based fill fluid may contain additives which prevent the fill fluid from freezing in cold environments. Further, the fill fluid may be acoustically matched with the particular underwater environment in which the acoustic array 100 is being used, so that the acoustic energy from the underwater environment is optimally propagated to the acoustic sensors 102. Using water-based fill fluids provide several advantages. Initially, less stringent handling conditions are required from conventional buoyant fill fluids including hydrocarbons, since water is benign to the underwater environment. Further, should the hosewall 110 develop a leak and expose a pocket 112 to the underwater environment, the intrusion of water from the underwater environment, such as sea water, into the pocket 112 will not significantly alter the buoyancy of the acoustic array 100. The components of the acoustic array 100 are also preferably inert in sea water and other corrosive environments, so that the intrusion of sea water or corrosive materials from the surrounding environment will not corrode the components.

The acoustic array 100 includes at least one strength member 114 extending longitudinally throughout the length of the acoustic array 100 to provide a load bearing mechanism for distributing longitudinal tensile loads applied to the acoustic array 100. Such longitudinal tensile loads may specifically arise during deployment, towing, and retrieval of the acoustic array 100. The longitudinal tensile loads applied to the acoustic array 100 can vary greatly and are dependent upon many factors, such as the diameter, the length, and the tow speed of the acoustic array 100. The acoustic array 100 illustrated in FIG. 1 shows three strength members 114 equi-distantly spaced from the center of the acoustic array 100. However, it is understood that alternative strength member 114 configurations may be utilized, ranging from a single centrally-located strength member to multiple strength members positioned equi-distant from the center of the acoustic array 100 or even form the strength member 114 within the hosewall 110. Thus, the specific materials used for the strength members 114 as well as the size of the strength members 114 will vary according the particular acoustic array 100 and particular strength member 114 configuration utilized. Any substantially non-elastic material having a high strength may be used to form strength members 114, such as stainless steel, synthetic ropes, Kevlar®, or other similar material. It is also possible to form the hosewall 110 of a high strength material such that the hosewall 110 itself provides the load bearing support for distributing longitudinal tensile loads in the acoustic array 100, where the strength member 114 could be removed from this configuration or used in conjunction with the hosewall 110 to provide additional load bearing support.

The acoustic array 100 also includes support spacers 116 positioned within the solid fill material 106 to provide radial support for the acoustic array 100. The circumference of the support spacers 116 abuts the inner surface of the hosewall 110 to prevent the hosewall from collapsing inward from mechanical handling. The support spacers further provide radial support for the strength members 114 during tensile loads as well as when the acoustic array 100 traverses a capstan. The support spacers 116 are preferably positioned at the edges 120 of the pockets 112 in order to provide the most possible protection for the sensor elements within the pockets 112 from radially extending forces. However, it is understood that the support spacers 116 may be positioned at any locations within the acoustic array 100 depending upon the desired support characteristics. The support spacers 116 are preferably formed of a molded hard plastic, but may be formed from other rigid materials that are inert in the sea water/fill fluid environment. The support spacers 116 are held in place on the strength members 114 either by directly molding the support spacers 116 onto the strength members 114 or by some sort of mechanical connection. The number of support spacers 116 provided will vary in accordance with the size of the particular acoustic array 100 and particular strength member configuration utilized.

Each of the acoustic sensors 102 are further connected via a communication pathway 118 passing through the longitudinally extending core 104 to telemeter their measured acoustic energy to a remote device. The communication pathway 118 is preferably formed of a bundle of optical fiber or other electrically passive pathway. Further, other sensing devices may be provided within the acoustic array 100, such as depth sensors, compasses, depth controllers, etc. These other sensing devices may each include their own communication paths or may be connected to the communication pathway 118.

Figure 3:
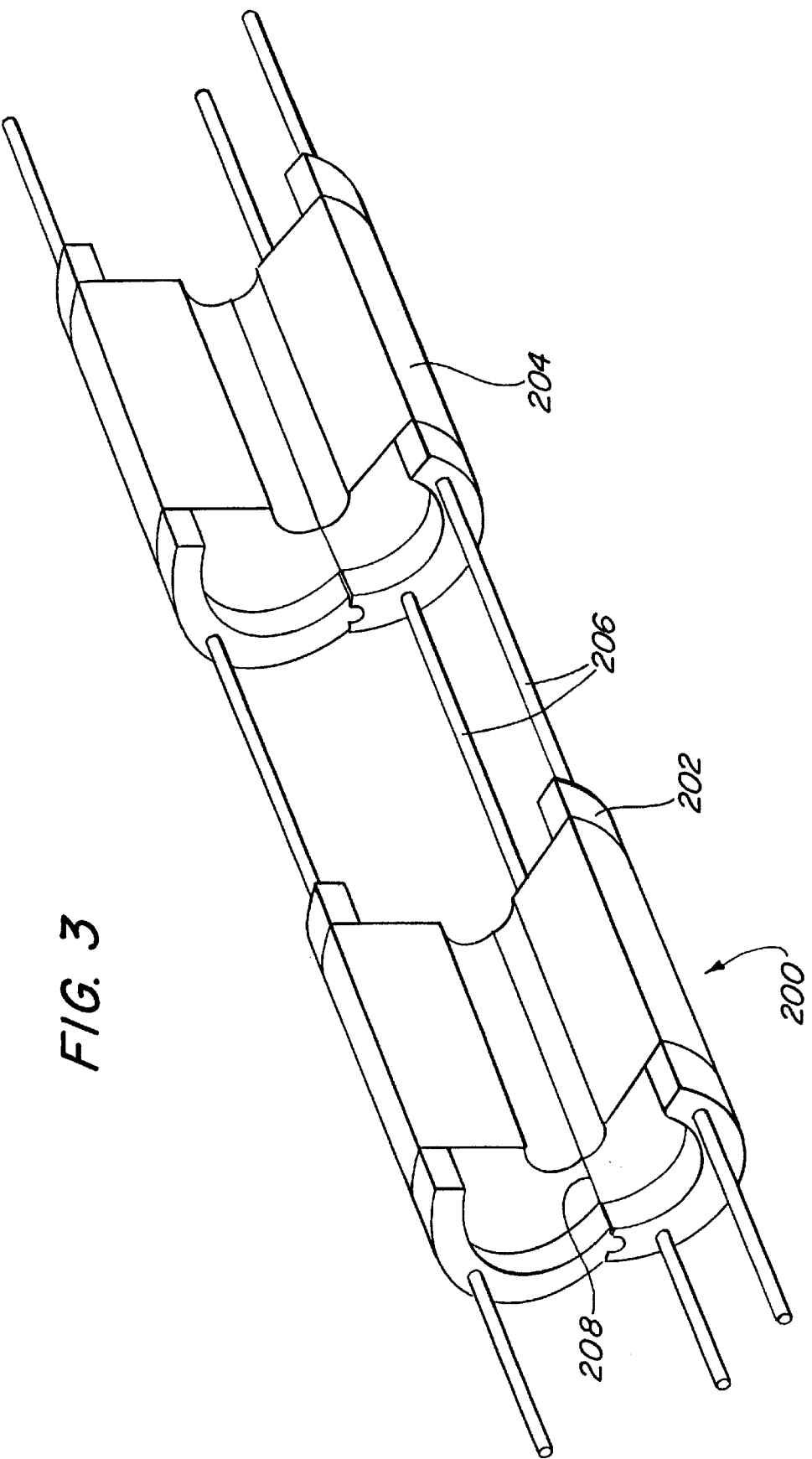
FIG. 3 is a partial perspective view of a hinged array substructure of another preferred embodiment of the acoustic array of the present invention.

In an alternative embodiment of the present invention, the acoustic array 100 may be formed having a basic array substructure 200 illustrated in FIG. 3. The substructure 200 includes a plurality of hinged hard spacers 202, a plurality of sections of solid fill material 204, and at least one strength member 206. These components of the array substructure 200 function equivalently to the above-described hard spacers 116, solid fill material 106, and strength member 114, wherein the components of FIG. 3 further allow the array substructure 200 to pivot about a hinge line 208. Each of the hard spacers 202 include a hinge 210 that pivots about the hinge line 208. Further, the sections of buoyant solid fill material 204 are bendable along the hinge line 208 in order to allow the solid fill material 204 to also pivot about the hinge line 208. This enables the acoustic array 100 to be easily assembled using a premanufactured array substructure 200 which is pivotal along hinge line 208 to facilitate the integration of acoustic sensors 102 and other sensor elements within the array substructure 200. After the acoustic sensors 102 or other sensor elements are positioned within the array substructure 200, the array substructure 200 is pivoted to a closed position and the hosewall 110 is formed around the array substructure 200 to form the acoustic array 100. This configuration further allows sensor elements to be easily interchanged altering the desired operating characteristics or for performing troubleshooting.

As can be seen from the foregoing, an acoustic array formed in accordance with the present invention utilizes lightweight components which allow a solid fill material to be used to control the buoyancy of the acoustic array. Moreover, by forming an acoustic array having a buoyant solid fill material in accordance with the present invention, the effects of surrounding underwater environment on the acoustic array are significantly reduced should a break in the hosewall enclosing the acoustic array occur. Furthermore, an acoustic array formed in accordance with the present invention allows water to be used as a fill fluid for the transduction of acoustic energy into acoustic sensors, which eliminates the environmental concerns associated with fill fluids and reduces the effects that water from the surrounding environment which incidentally enters into the acoustic array and mixes with the fill fluid will have on the buoyancy of the acoustic array.

In each of the above embodiments, the different structures of the acoustic array of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An array of electrically inert, fiber optic acoustic sensors for measuring acoustic energy in an underwater environment, comprising:
   a longitudinally extending outer casing;
   a plurality of sections of solid fill material providing controlled buoyancy properties for the array, wherein the section of solid fill material define a plurality of pockets within the outer casing in areas between the sections of solid fill material;
   a plurality of fiber optic acoustic sensors positioned at predetermined points in the array within respective pockets formed between the sections of solid fill material; and
   a fill fluid contained within each pocket contacting both a fiber optic acoustic sensor respectively positioned within each pocket and the longitudinally extending outer casing.

2. The acoustic array of claim 1, wherein each of the pockets contain a fill fluid which propagates acoustic energy from the underwater environment to the acoustic sensors within the pockets.

3. The acoustic array of claim 2, wherein the fill fluid is a water-based fluid.

4. The acoustic array of claim 2, wherein the fill fluid provides no positive buoyancy characteristics for the acoustic array.

5. The acoustic array of claim 1, wherein the acoustic array is comprised entirely of electrically passive components.

6. The acoustic array of claim 2, wherein the acoustic array is comprised entirely of components inert to the underwater and fill fluid environments.

7. The acoustic array of claim 1, further comprising at least one strength member extending longitudinally through the acoustic array for providing a load bearing mechanism for distributing longitudinal tensile forces applied to the acoustic array.

8. The acoustic array of claim 7, wherein the at least one strength member is positioned within the outer casing itself.

9. The acoustic array of claim 7, further comprising at least one radial support spacer positioned within the outer casing for providing radial support for the acoustic array.

10. The acoustic array of claim 1, wherein the outer casing is formed having a high strength structure to provide a load bearing mechanism for distributing longitudinal tensile forces applied to the acoustic array.

11. The acoustic array of claim 1, wherein the solid fill material is comprised of a polyurethane material including substantially incompressible voids.

12. The acoustic array of claim 11, wherein the incompressible voids are glass micro-balloons.

13. The acoustic array of claim 1, wherein the solid fill material is comprised of a rubber material including substantially incompressible voids.

14. The acoustic array of claim 13, wherein the incompressible voids are glass micro-balloons.

15. The acoustic array of claim 1, wherein the solid fill material is comprised of an epoxy material including substantially incompressible voids.

16. The acoustic array of claim 15, wherein the incompressible voids are glass micro-balloons.

17. The acoustic array of claim 1, further comprising a pivotal array substructure positioned within the outer casing, the array substructure comprising:
   a plurality of pivotal radial support spacers which provide radial support for the acoustic array having a common pivot line; and
   the sections of solid fill material being positioned between the pivotal support spacers, wherein the sections of solid fill material are further pivotal about the same pivot line as the pivotal support spacers.

18. The acoustic array of claim 17, further comprising at least one strength member which extends through the pivotal radials support spacers and sections of solid fill material for providing a load bearing mechanism for distributing longitudinal tensile forces applied to the acoustic array.

19. The acoustic array of claim 18, wherein the pivotal array substructure may be pivoted to an open position to allow the acoustic sensors to be easily removed.

20. The acoustic array of claim 1, wherein the pockets are fluidically separated from one another.

21. An array of optical based sensors for measuring events in an underwater environment, comprising:
   a longitudinally extending outer casing;
   a plurality of sections of solid fill material providing controlled buoyancy properties for the array;
   a plurality of pockets formed within the outer casing in areas between the sections of solid fill material;
   a plurality of optical based sensors positioned at predetermined points in the array within respective pockets formed between the sections of solid fill material; and
   a fill fluid contained within each pocket contacting both a fiber optic acoustic sensor respectively positioned within each pocket and the longitudinally extending outer casing.

22. The sensor array of claim 21, wherein each of the pockets contain a fill fluid which propagates acoustic energy from the underwater environment to the sensors within the pockets.

23. The sensor array of claim 22, wherein the fill fluid is a water-based fluid.

24. The sensor array of claim 22, wherein the fill fluid provides no positive buoyancy characteristics for the acoustic array.

25. The sensor array of claim 21, wherein the sensor array is comprised entirely of electrically passive components.

26. The sensor array of claim 22, wherein the sensor array is comprised entirely of components inert to the underwater and fill fluid environments.

27. The sensor array of claim 21, wherein the optical based sensors are fiber optic sensors.

28. The sensor array of claim 21, further comprising at least one strength member extending longitudinally through the sensor array for providing a load bearing mechanism for distributing longitudinal tensile forces applied to the sensor array.

29. The sensor array of claim 28, wherein the at least one strength member is positioned within the outer casing itself.

30. The sensor array of claim 28, further comprising at least one radial support spacer positioned within the outer casing for providing radial support for the sensor array.

31. The sensor array of claim 21, wherein the outer casing is formed having a high strength structure to provide a load bearing mechanism for distributing longitudinal tensile forces applied to the sensor array.

32. The sensor array of claim 21, wherein the solid fill material is comprised of a polyurethane material including substantially incompressible voids.

33. The sensor array of claim 32, wherein the incompressible voids are glass micro-balloons.

34. The sensor array of claim 21, wherein the solid fill material is comprised of a rubber material including substantially incompressible voids.

35. The sensor of claim 34, wherein the incompressible voids are glass micro-balloons.

36. The sensor array of claim 21, wherein the solid fill material is comprised of an epoxy material including substantially incompressible voids.

37. The sensor array of claim 36, wherein the incompressible voids are glass micro-balloons.

38. The sensor array of claim 21, further comprising a pivotal array substructure positioned within the outer casing, the array substructure comprising:
   a plurality of pivotal radial support spacers which provide radial support for the sensor array having a common pivot line; and
   the sections of solid fill material being positioned between the pivotal support spacers, wherein the sections of solid fill material are further pivotal about the same pivot line as the pivotal support spacers.

39. The sensor array of claim 38, further comprising at least one strength member which extends through the pivotal radials support spacers and sections of solid fill material for providing a load bearing mechanism for distributing longitudinal tensile forces applied to the sensor array.

40. The sensor array of claim 39, wherein the pivotal array substructure may be pivoted to an open position to allow the sensors to be easily removed.

41. The sensor array of claim 21, wherein the pockets are fluidically separated from one another.

42. A method of forming an array of acoustic sensors for measuring acoustic energy in an underwater environment, comprising the steps of:

providing an array substructure including:
- a plurality of pivotal radial support spacers which provide radial support for the acoustic array having a common pivot line;
- sections of solid fill material positioned between the pivotal support spacers, wherein the sections of solid fill material are further pivotal about the same pivot line as the pivotal support spacers; and
- at least one strength member which extends through the pivotal radials support spacers and sections of solid fill material for providing a load bearing mechanism for distributing longitudinal tensile forces applied to the acoustic array;

positioning acoustic sensors within the array substructure in gaps existing between the sections of solid fill material;

pivoting the array substructure about the pivot line to a closed position; and enclosing the array substructure with a longitudinally extending outer casing.

43. An array fiber optic acoustic sensors arranged to be towed by a vessel to measure acoustic energy in an underwater environment, comprising:
- a longitudinally extending outer casing;
- a longitudinally extending tubular core member;
- a plurality of sections of solid fill material providing all of the controlled buoyancy properties for the array, wherein the section of solid fill material define a plurality of pockets within the outer casing in areas between the sections of solid fill material; and
- a plurality of lightweight fiber optic acoustic sensors positioned at predetermined points in the array within respective pockets formed between the sections of solid fill material and around said tubular core member, wherein the fiber optic acoustic sensors are substantially cylindrically symmetrical with respect to a longitudinally extending central axis of the array.

44. An array fiber optic acoustic sensors arranged to be towed by a vessel to measure acoustic energy in an underwater environment, comprising:
- a longitudinally extending outer casing;
- a plurality of sections of solid fill material providing all of the controlled buoyancy properties for the array, wherein the section of solid fill material define a plurality of pockets within the outer casing in areas between the sections of solid fill material; and
- a plurality of lightweight fiber optic acoustic sensors positioned at predetermined points in the array within respective pockets formed between the sections of solid fill material; and
- a fill fluid contained within each pocket occupying an entire area extending radially outward from said fiber optic acoustic sensors to said longitudinally extending outer casing, wherein said fill fluid acoustically connects said fiber optic acoustic sensors with said outer casing.

* * * * *